June 28, 1927.

N. MINORSKY

SYSTEM OF MOTOR CONTROL

Filed Sept. 1, 1925

Inventor:
Nicolas Minorsky,
by
His Attorney.

Patented June 28, 1927.

1,633,822

UNITED STATES PATENT OFFICE.

NICOLAS MINORSKY, OF PHILADELPHIA, PENNSYLVANIA, ASSIGNOR TO GENERAL ELECTRIC COMPANY, A CORPORATION OF NEW YORK.

SYSTEM OF MOTOR CONTROL.

Application filed September 1, 1925. Serial No. 53,899.

My invention relates to improvements in systems of motor control and in particular to systems for automatically maintaining a predetermined relation between the speeds of a plurality of separate driving motors.

A segregated drive for a paper making machine, for example, presents difficulties in the accurate maintenance of the desired speed relation of the separate driving motors, since it is required that the motors operate practically as if they were mechanically connected to each other and the requirements are further that the speed relation shall be readily adjustable while the machine is operating. Although not necessarily limited thereto, the invention is particularly applicable to such segregated drives and the invention has for one of its objects the provision of a simple, effective and inexpensive arrangement whereby the desired speed relation is adjustable and is automatically maintained in the adjusted relation.

In carrying the invention into effect in the form which I now regard as the preferred form, I provide an arrangement whereby a portion of the motors is influenced in one direction and the remainder of the motors in the opposite direction in response to the rate of variation of the portion from the predetermined speed relation of the motors. Thermionic means such as a pliotron or pliotrons are employed for controlling speed regulating means for the motors and these pliotrons are connected so as to respond to the rate of variation of the speeds of the motors from the predetermined relation. The pliotrons with the speed regulating means function to produce a locking-in-step effect intended to hold the motors together as if they were mechanically connected.

Figure 1:
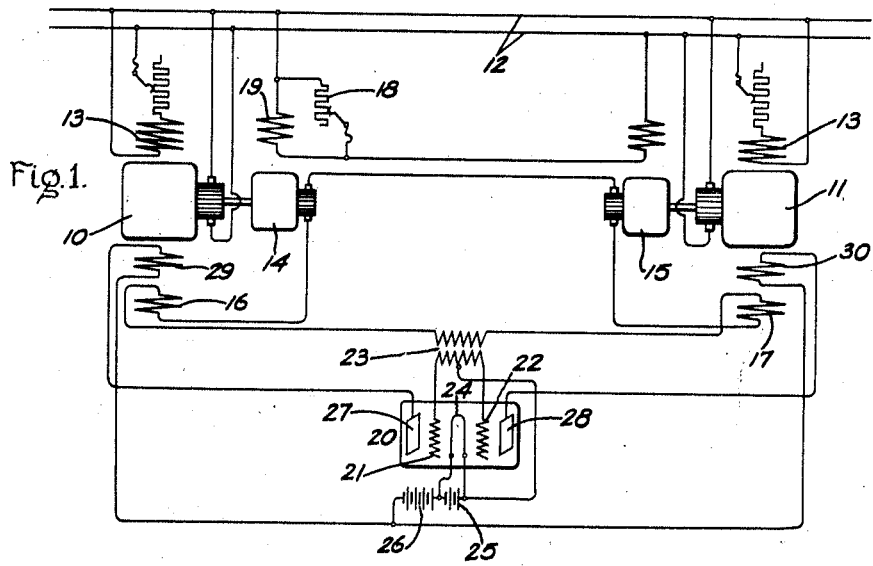
Figure 2:
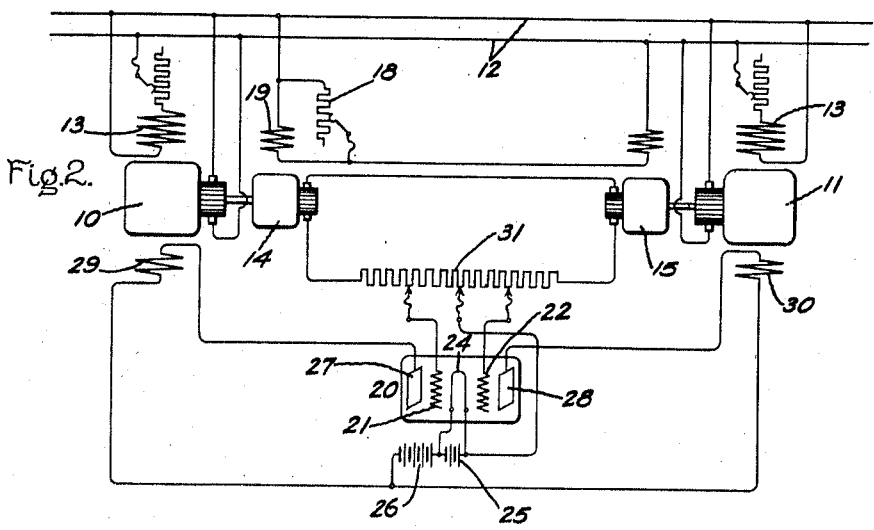
Figure 3:
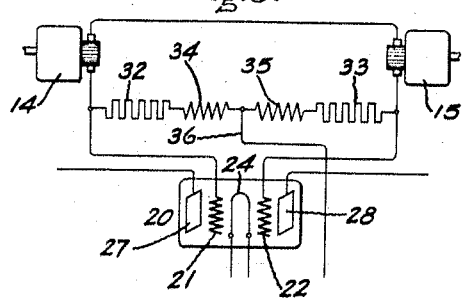

For a better understanding of the invention, reference is had to the accompanying drawing, wherein Fig. 1 is a simplified diagram of a control system for two electric motors in accordance with the invention, Fig. 2 is a modified form of the arrangement of Fig. 1, and Fig. 3 is a detail of a further modified form of the invention combining the features of the arrangements of Figs. 1 and 2 in a simple scheme.

Referring to the drawings, the separate driving motors 10 and 11 for separate units of the paper machine are supplied with energy from the direct current source of supply 12. Each of these motors is provided with an adjustable separately excited field winding 13 for determining the approximate running speed of the motor. The driving motor 10 has mechanically connected thereto a small generator or exciter 14, and the motor 11 has a similar small generator or exciter 15. The armatures of these exciters are connected in a local circuit which includes the controlling field winding 16 of the motor 10 and the controlling field winding 17 of the motor 11. The exciters are preferably separately excited from the supply circuit 12, and the variable resistor 18 is shunted about the separately excited field winding 19 of the exciter 14. By means of this rheostat 18, the voltages developed by the two exciters may be adjusted with reference to each other. The armatures of the exciters are connected with each other in such a manner that their voltages oppose each other and these voltages are adjusted so as to be equal when the motors 10 and 11 are operating with the predetermined speed relation of the motors. In case, for example, the motor 10 should increase in speed out of the predetermined speed relation, the voltage generated by the exciter 14 will cause a current to be sent through the field winding 16 in such a direction that the flux set up thereby adds to the flux set up by the separately excited field winding 13 of the motor 10 so as to thereby effect a speed reduction of the motor 10. It will be observed that the direction of current through the controlling field winding 17 of the motor 11 is in the opposite direction to the current through the controlling field winding 16 of motor 10, so that the flux set up by field winding 17 will be differential with respect to the separately excited field 13 of motor 11, thus effecting an increase in speed of motor 11. An approximately correct adjustment is thus had in case of a departure of either one of the driving motors from the predetermined speed relation, although this action is relatively sluggish, since there must be a comparatively large departure from the predetermined speed relation before an appreciable current is set up to correct the departure, and furthermore the corrective effect is not applied until after there has been a departure from the desired speed relation. It will be obvious that as long as the two exciters 14 and 15 generate equal and opposite potentials, there will be no exchange of current between the exciters and through the controlling field windings 16 and 17, but if either one or the other of the exciters varies in speed with reference to the predetermined relation with the other exciter, there will be an interchange of current in a direction and of a value determined by the direction of the departure from the predetermined speed relation and approximately in accordance with the extent of the departure.

In order to provide an anticipating control so that the motors 10 and 11 may be locked in step practically as if they were mechanically connected, I have provided the thermionic device 20 which is connected as indicated. The grids 21 and 22 of this thermionic device have applied thereto a potential which varies in accordance with the rate of variation of the difference in the voltages of the two exciters 14 and 15, since these grids are connected to the terminals of the secondary of a transformer 23 which has its primary included in the local circuit comprising the armatures of the exciters 14 and 15 and the controlling field windings 16 and 17. The filament 24 of the thermionic device 20 is heated with current supplied from the battery 25 and the plate circuit is energized by the battery 26. The plates 27 and 28 are respectively connected to regulating field 29 of motor 10 and the regulating field 30 of motor 11. With this arrangement a rapid anticipating action is obtained which is not responsive to the final difference in the speeds of the two motors 10 and 11, as is the case with the effects of the field windings 16 and 17, but rather to the rate of variation of that difference, or stated in another way, to the relative angular acceleration of the two motors 10 and 11.

The thermionic device 20 is indicated as one having a single filament and two plates with corresponding grids. This is a rather special form of a thermionic device, and it is to be understood that the invention is not necessarily limited to this particular type of thermionic device, since those skilled in the art can readily appreciate that the device functions as two single pliotrons. In the particular device illustrated, the two single pliotrons are provided with a common filament, although as above stated this is not necessary since each of the pliotrons may have its own separate filament.

The thermionic device 20 will operate in response to the relative change of the current in the field windings 16 and 17 in response to a departure from the predetermined speed relation of the motors 10 and 11 and will cause a current to be sent through the field winding 29 of the motor 10 in one direction and a current to be sent through the field winding 30 of the motor 11 in the opposite direction so as to anticipate and at times supplement the effect of the field winding 16 of motor 10 and the field winding 17 of motor 11. Since the current which is thus sent through the field winding 29 and the current which is sent through the field winding 30 is of a value dependent upon the rate of variation of the speeds of the motors from the predetermined speed relation, these field windings will provide an anticipating action, which, combined with the effect of the field windings 16 and 17 will cause the motors to operate practically as if they were mechanically connected. It will be understood that when there is a departure or a tendency to departure from the predetermined speed relation, the regulating effect applied by the field windings 16 and 29 to motor 10 will be in one direction, whereas the regulating effect applied by the field windings 17 and 30 of motor 11 will be in the opposite direction, thereby effecting a restoration of the predetermined speed relation in a very short interval of time, the time interval being so short that to all intents and purposes the motors will operate as if they were mechanically connected.

When the two motors run at a strictly constant speed, or at the same speed, the circuit including the armatures of exciters 14 and 15 and field windings 16 and 17 is not traversed by any current and there is no electromotive force induced in the secondary of the transformer 23. Whenever a disturbance occurs, changing the speed of one motor relatively to that of the other, the circulating current in this circuit will flow through the primary of the transformer 23 and an electromotive force $M_o \frac{di}{dt}$ will be set up in the secondary of of the transformer (where $M_o$ denotes the coefficient of mutual inductance between the primary and the secondary of the transformer 23) increasing the potential of the one grid relative to the filament and decreasing the potential of the other grid relative to the filament. The more positive potential grid will account for a greater plate current flowing into its corresponding motor winding, and vice versa. The connections are such that in the machine which is accelerating, the electronic plate current flowing in its regulating winding will contribute to the magnetization of the motor and counteract further acceleration of the motor.

In Fig. 2 I have shown a modified form of the invention in which the regulating windings 16 and 17 of the arrangement of Fig. 1 are eliminated and the entire regulating effect obtained through the action of the motor field windings 29 and 30. The armatures of the two exciters 14 and 15 are connected with each other through a comparatively high resistance 31. With this connection the potential drop across sections of this resistance is a measure of the difference between the electromotive forces of the two exciters 14 and 15 since the internal drop of potential in the armatures of the exciters can be neglected. By connecting the mid-point of the resistance with the filament 24 of the double pliotron and by connecting the grids 21 and 22 to the resistance 31 as indicated, it is possible to utilize the ohmic drop across the resistance in effecting a control of the double pliotron 20 and thus control the speeds of motors 10 and 11 through the regulating field windings 29 and 30, since the ohmic drop is proportional to the departure from the predetermined speed relation of the motors 10 and 11 and this ohmic drop is effective to control the plate currents which pass through the field windings 29 and 30. The parts of Fig. 2 which correspond to similar parts of Fig. 1 are designated by similar reference numerals. By adjusting the connection of the filament 24 with the resistance 31 and the connections of the grids 21 and 22 with the resistance 31, the arrangement may be adjusted for the maintenance of any desired speed relation, and it will be observed that in this arrangement the anticipating effect of the regulation supplied by the pliotron 20 connected as indicated is the entire regulating effect of the motors 10 and 11.

Fig. 3 shows a detail of a modified form of the invention, only so much of the system being shown as would seem necessary to an understanding of the same after an understanding has been had of the systems of Figs. 1 and 2. In the arrangement of Fig. 3, the armatures of the exciters 14 and 15 are connected together in a local circuit including the resistors 32 and 33 which are of substantially equal resistance value and which are each of comparatively high resistance. The reactances 34 and 35 are substantially equal in value and in fact the two reactances may be combined into a single reactance with a tap 36 thereof taken off at a mid-point of the reactance and connected to the filament 24 of the pliotron, in a manner similar to the arrangements of Figs. 1 and 2. The grids 21 and 22 are connected as indicated and the plates of the pliotron are intended to be connected to the motor field windings 29 and 30 as indicated in Fig. 2.

Assume that the exciters 14 and 15 are operating with the predetermined speed relation established and that the voltages of the exciters are such that no current flows through the local circuit including the resistor 32, reactances 34 and 35 and resistor 33. In this case there will be no current flowing through the plate circuits of the pliotron. If the relative angular acceleration of the two motors connected to the exciters 14 and 15 begins to appear, a transient current starts flowing through the local circuit in which the exciter armatures are connected and a potential difference across the reactance coils 34 and 35 equal to $1\frac{di}{dt}$ will be set up and will, as previously described so act on the grids 21 and 22 that one plate current will rise and the other plate current will decrease. This will have for its final effect the counteraction of the acceleration of the unit which has the tendency to accelerate and the counteraction of the deceleration of the decelerating motor.

At a subsequent period the relative acceleration of the separate driving motors will cease owing to the above described action of the plate current energizing the field coils 29 and 30 to retard this relative acceleration, but in case there is a continuing steady departure of the speed difference of the motors 10 and 11 from the predetermined speed relation of the motors, this steady departure will be equal to the time integral of the acceleration and will cause a steady flow of current through the local circuit in which the exciter armatures are included. During this period the potential difference set up between the filament of the pliotron and the grids thereof will be a measure of the ohmic drop across the resistances 32 and 33. The action of the control will be the same as the action of the exciters in controlling the field windings 16 and 17 of the arrangement of Fig. 1 and the speed readjustment will continue until the predetermined speed relation has been restored. However, the action of the anticipating control effected by the presence of the reactances 34 and 35 in the local circuit will now be directed against that of the restoring control introduced by the effect of the resistors 32 and 33, thereby damping out the disturbance and effecting an antihunting approach to the predetermined speed relation of the motors 10 and 11.

The above described system will lock the two controlled motors at a strictly constant speed difference and will keep them at that speed difference in a dead beat manner, damping out any accidental speed fluctuations due to the load of some other disturbances by reason of the above described anticipating effect of the control. In case it is desired to change the speed relation of the motors, this may be done by varying the resistor 18 of Figs. 1 and 2 so as to alter the excitation of the two exciters 14 and 15. Assume for example that the two motors 10 and 11 are set to run at a definite speed difference, for example the motor 10 to run at 1,000 revolutions per minute and the motor 11 at 997 revolutions per minute, and that it is desired to change this speed relation and have some other relation to be automatically maintained. By decreasing the effective value of the resistance 18, the excitation of the exciter 14 is decreased and the excitation of the exciter 15 is increased. This will cause the motor 10 to develop a greater speed relatively to the motor 11 than previously since the motor 10 must develop such a speed that the electromotive force generated by the exciter 14 will be the same as was previously the case. This new speed relation will be automatically maintained in the manner previously explained. The absolute value of the speed of motors 10 and 11 is fixed by adjusting the excitation of the separately excited fields 13, and the dead beat locking speeds of the motors 10 and 11 will be accomplished independently of simultaneous variations in the speeds of motors 10 and 11. Such simultaneous and proportionate variation of the speeds of the separate driving motors does not present a problem in systems of this sort since the principal requirement is that the predetermined speed relation shall be maintained, minor variations in the speed of the driven machine being permitted as long as the predetermined speed relation of the separate driving motors is maintained.

What I claim as new and desire to secure by Letters Patent of the United States, is:—

1. In combination, a plurality of mechanically independent electric motors, and speed regulating means for each of said motors, said means including thermionic means connected with the motors to respond to the rate of variation of the speeds of the motors from a predetermined relation for controlling the speeds of the motors to restore the said speed relation and cause the motors to operate practically as if they were mechanically connected.

2. In combination, a plurality of electric motors which are mechanically independent, electrically interconnected means for setting up a current in a direction and of a value proportionate to the variation of the speeds of said motors from a predetermined speed relation of the motors, and speed regulating means for said motors including thermionic means connected to respond to said current for maintaining the said speed relation of the motors.

3. In combination in a system for maintaining a predetermined speed relation between a plurality of mechanically independent motors, speed regulating means for said motors including thermionic means connected to respond to the rate of variation of said motors from the predetermined speed relation and connections through which said speed regulating means effects a speed regulating effect in one direction to a portion of said motors and a speed regulating effect in the opposite direction to the remainder of the motors in response to a variation of the speed of said portion of the motors out of said predetermined relation of the motors effecting a corresponding operation of said thermionic means, whereby the said speed relation is promptly restored.

4. In combination in a system for maintaining a predetermined speed relation between a plurality of mechanically independent motors, a generator operated by each of said motors, the said generators being electrically interconnected and adjusted to effect an exchange of current between the generators only when the speeds of said motors depart from the said predetermined relation, and speed regulating means including thermionic means electrically connected to govern the speeds of said motors in response to the rate of change of the said exchange current between said generators to maintain the said speed relation of the motors substantially as if the motors were mechanically connected.

5. In combination, a plurality of mechanically independent electric motors, means operated by the motors for setting up a current which varies in direction and value in response to the momentary variation of the speeds of said motors from a predetermined speed relation of the motors, and speed regulating means including thermionic means connected to respond to the rate of change of said current for governing each of said motors to maintain the predetermined speed relation of the motors.

In witness whereof, I have hereunto set my hand this 13th day of August, 1925.

NICOLAS MINORSKY.